United States Patent [19]

Simons

[11] Patent Number: 5,201,584
[45] Date of Patent: Apr. 13, 1993

[54] MECHANISM FOR PRELOADING LINEAR BEARING SLIDES

[75] Inventor: Everett F. Simons, Cedar Knolls, N.J.

[73] Assignee: AT&T Bell Laboratories, Murray Hill, N.J.

[21] Appl. No.: 956,434

[22] Filed: Oct. 1, 1992

Related U.S. Application Data

[63] Continuation-in-part of Ser. No. 762,515, Sep. 18, 1991, abandoned.

[51] Int. Cl.$^5$ .................... F16C 29/04; F16C 29/12
[52] U.S. Cl. .................................... 384/49; 385/54
[58] Field of Search ................... 384/49, 54, 57, 37

[56] References Cited

U.S. PATENT DOCUMENTS

| | | | |
|---|---|---|---|
| 2,028,718 | 1/1936 | Heine . | |
| 2,672,378 | 3/1954 | McVey | 384/49 |
| 3,113,807 | 12/1963 | Polidor | 384/49 |
| 3,145,065 | 8/1964 | Cator . | |
| 3,342,534 | 9/1967 | King | 384/49 |
| 3,897,119 | 7/1975 | McMurtrie | 384/55 |
| 4,517,778 | 5/1985 | Nicolai . | |
| 4,923,311 | 5/1990 | Gibbs et al. | 384/54 X |

FOREIGN PATENT DOCUMENTS

| 38215 | 2/1986 | Japan | 384/49 |
|---|---|---|---|
| 703762 | 2/1954 | United Kingdom | 384/49 |

OTHER PUBLICATIONS

Wave Springs Engineering and Parts Catalog, by Smalley Steel Ring Company, pp. 8, 12, 13, 23, 24, 25, 26, no date.

*Primary Examiner*—Thomas R. Hannon
*Attorney, Agent, or Firm*—A. G. Steinmetz

[57] ABSTRACT

A linear bearing slide assembly comprises an outer member, an inner member, a pair of linear bearing mechanisms, a preloading bar and a longitudinal spring. The outer member has a primary channel opening for accepting the inner member, and two secondary channel openings for accepting the linear bearing mechanisms and a preloading assembly. The inner member is located in the primary channel opening of the outer member. The first and second linear bearing mechanisms are located in the secondary channels on opposite sides of the primary channel opening. These linear bearing mechanisms support and guide the inner member as it travels along the primary channel opening in the outer member. Each of the linear bearing mechanisms can be conventionally constructed with either sliding or a plurality of rolling elements between two bearing ways. One of the linear bearing mechanism is compressed between the inner member and a preloading bar in the secondary channel by a longitudinal spring typically having a sinusoidal contour. The spring provides a compressive force to the preloading bar to eliminate component play and provide a consistent preload to the linear bearing mechanisms.

3 Claims, 4 Drawing Sheets

MECHANISM FOR PRELOADING LINEAR BEARING SLIDES

This application is a continuation-in-part of application Ser. No. 07/762,515 filed on Sep. 18, 1991 now abandoned.

FIELD OF THE INVENTION

This invention relates to linear slides and in particular to a mechanism for preloading the linear bearings and thereby relaxing the required tolerances of an outer member, bearing components and an inner member, concurrently reducing the backlash in the linear slide. This is further concerned with dynamic compensation for dimensional variation and installation conditions.

BACKGROUND OF THE INVENTION

Linear slides are widely used to allow linear translational motion between members of mechanisms. These linear slides typically include adjustment elements for controlling clearances between the inner member and its guides. The adjustment elements are often used to apply a preload force to eliminate backlash and reduce compliance perpendicular to the direction of articulation. In the majority of these arrangements, compressive loading of the bearing elements between the outer member and inner member is provided by manual adjustment.

It is desirable to eliminate the need for continued adjustment in applications where the linear slides are not readily accessible or where frequent adjustment would otherwise be required due to the wear of constant use. Continued adjustment has the disadvantage that the adjustments may not be uniform in application or may be too tight or too loose. If done manually adjustment has the additional disadvantage of being labor intensive and therefore expensive. Even a linear slide that is properly adjusted when free standing can, when installed, become too loose or become too tight to the point of binding, depending on the exact interface conditions of the installation.

One previous arrangement, disclosed in U.S. Pat. No. 3,145,065, provides a compensating mechanism to prevent loss of accuracy in a rectilinear bearing assembly using balls and radially compliant longitudinal rods to support and guide the inner member within the outer member. The longitudinal rods are comprised of tubular members having a relatively large modulus of elasticity and a relatively high yield point. These tubular members are meant to compensate for loose tolerances in the ball assembly.

Another arrangement, disclosed in U.S. Pat. No. 2,028,718, provides ball races formed by elastic steel bands in order to form a dust proof bearing. These steel bands are meant to reduce the need for accuracy in manufacture of the bearing since these bands tend to compensate for ball expansion.

Another arrangement, disclosed in the British patent specification 703,762, discloses apparatus for providing an automatic non-manual adjustment of a linear slide by applying the pressure of a spring against a bar supporting a linear slide mechanism. This however is a pre-use adjustment and the bar coupling the spring pressure to the linear slide is bolted down prior to use of the linear slide bearing. Hence, the adjustment is static and the linear slide bearing may subsequently come out of adjustment during use.

These priorly disclosed mechanisms do not however provide continuous compensation for changes occurring after an initial adjustment.

SUMMARY OF THE INVENTION

A linear slide embodying the principles of the invention comprises an outer member, an inner member, first and second linear bearing mechanisms, a preloading bar and a longitudinal spring. The outer member has a primary channel opening for accepting an inner member, and two secondary channels, one in each side of the primary channel, for accepting linear bearing mechanisms. The inner member is located in the primary channel opening. First and second linear bearing mechanisms are located in the secondary channels. These linear bearing mechanisms support and guide the inner member in the primary channel opening in the outer member. The first linear bearing mechanism is conventionally constructed; it can consist of sliding elements or a plurality of rolling elements between two bearing ways, and resides in one of the secondary channels. The second linear bearing mechanism is in the other secondary channel. The preloading bar is contiguous with the second linear bearing mechanism along its entire length. The longitudinal spring is contiguous with the preloading bar on one side and the outer member on the other side. This longitudinal spring is used to provide a compressive force to the preloading bar to eliminate backlash and provide a predictable preload to the linear bearing mechanisms. The preloading bar includes a longitudinal pedestal that is contiguous with a channel in the outer member along its entire length. It acts as a fulcrum to fix the angle of the preload bar and oppose rotational movement of the preloading bar. This allows the preloading bar to have some free motion and provide continuous adjustment to the linear slide.

DETAILED DESCRIPTION

Figure 1:
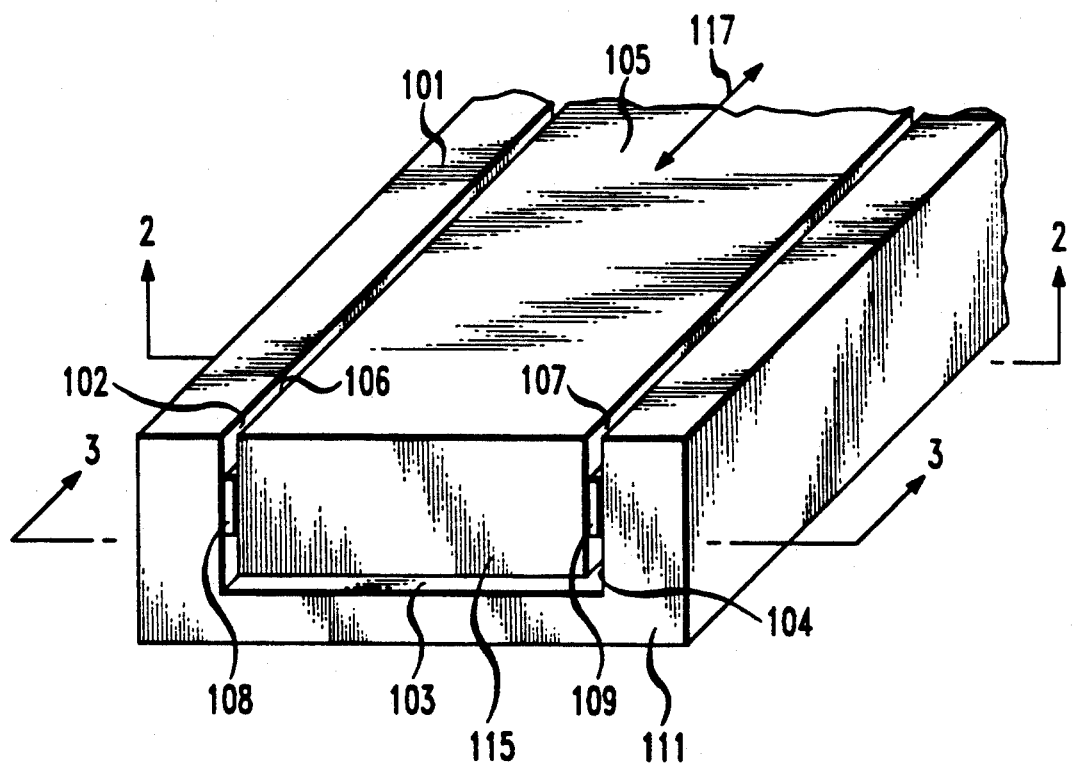
FIG. 1 is a pictorial view of a linear slide embodying the principles of the invention.

A linear slide is shown in pictorial form in FIG. 1. An outer member (101) includes a channel defined by the sides 102, 103 and 104 internal to the outer member. Located within the channel is an inner member (105) which translates substantially freely along the rectilinear path defined by the arrow 117. The inner member 105 is supported in and guided along the channel by linear bearing mechanisms between the opposite sides 106 and 107 of the inner member 105 and the channel sides 102 and 104. These linear bearing mechanisms are hidden by the covering end plates 111 and 115 attached to the outer member 101 and the inner member 105, respectively. The ends of retainers 108 and 109 for the rolling elements are shown between the inner member 105 and the outer member 101.

Figure 2:
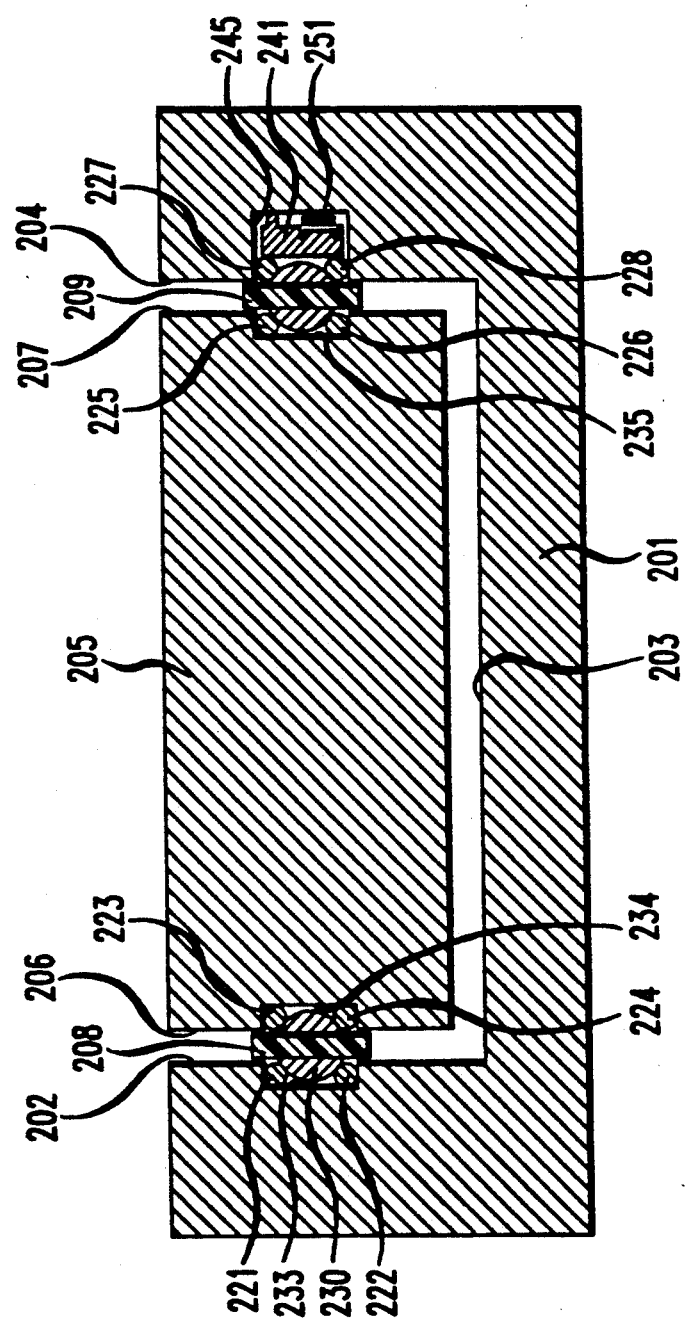
FIG. 2 is an end view of a linear slide having linear bearing mechanisms in accord with the invention, shown with its end plates removed.

A vertical plane cross section (cross section cut 2 in FIG. 1) of this linear slide is shown in FIG. 2. First and second linear bearing mechanisms are located on opposite sides of the linear slide. The left linear bearing mechanism is conventional and includes bearing ways (rod pairs 221-222 and 223-224) in secondary channels 233 and 234, respectively, located in the channel wall 202 of the outer member and the side 206 of the inner member. These bearing ways or rods control the travel path of the rolling elements 230 running between the pair of bearing ways. A retainer 208 keeps the rolling elements equally spaced along the bearing ways 221-222 and 223-224.

The right linear bearing mechanism has one of its bearing ways (rod pair 225-226) in a secondary channel 235 in the side 207 of the inner member 205. The other bearing way (rod pair 227-228) is contiguous with a preloading bar 241 which is positioned in a secondary channel opening 245 in the side 204 of the primary channel in the outer member 201. A longitudinal spring 251, typically having a wave or substantially sinusoidal longitudinal contour, is positioned between the base of the secondary channel opening 245 and the preloading bar 241. The spring 251 applies compressive force against the preloading bar 241 which in turn applies force to the linear bearing mechanisms thorough the bearing way formed by rod pair 227-228.

Figure 3:
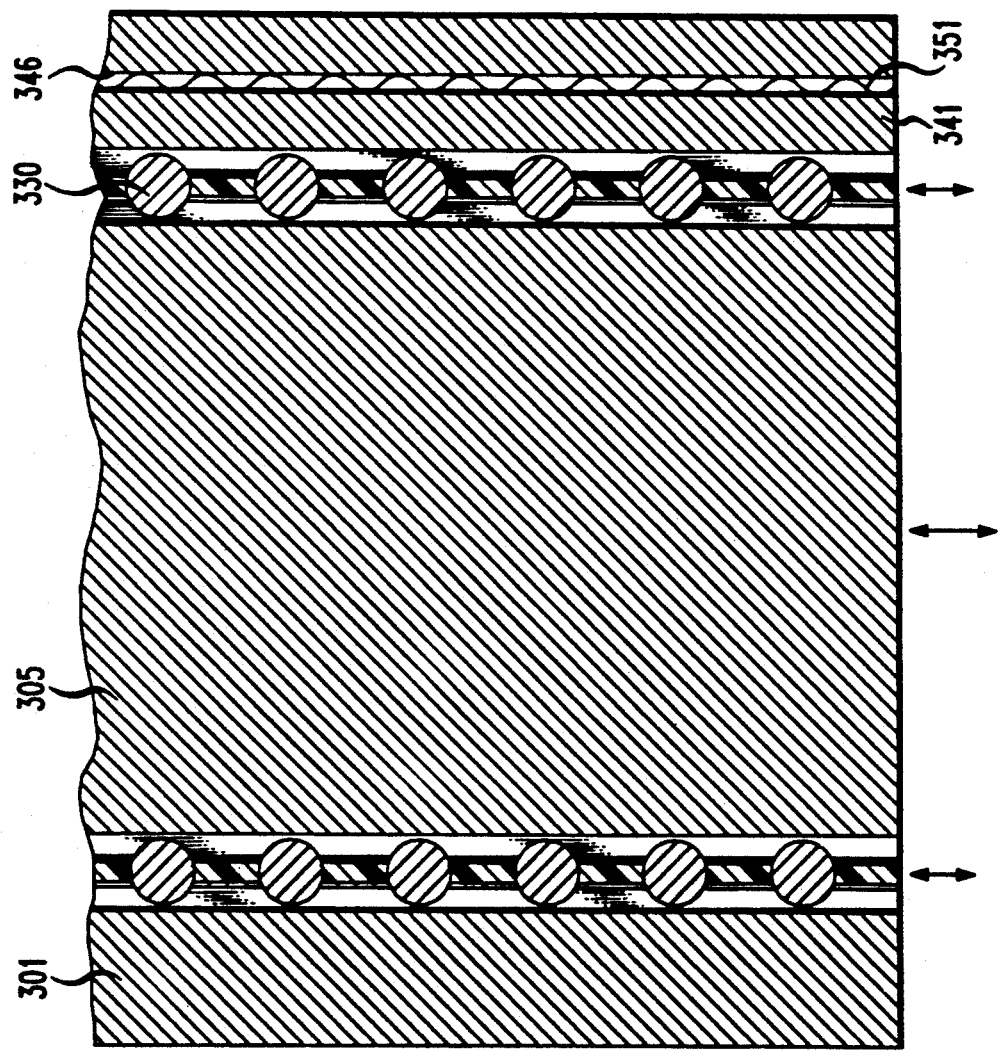
FIG. 3 is a plan view of a linear slide having linear bearing mechanisms in accord with the invention.

A horizontal cross section (cross section cut 3 in FIG. 1) of the linear slide is shown in FIG. 3. The inner member 305 is seen positioned in the primary channel of the outer member 301. The longitudinal spring 351 is shown located between the preloading bar 341 and the base 346 of the secondary channel so that alternate peaks of its typically sinusoidal or undulating contour are contiguous to the preloading bar 341 and secondary channel base 346. The spring applies a compressive force to the preloading bar to keep the linear slide in proper adjustment by eliminating backlash and providing a preload to the linear bearing mechanisms.

Figure 4:
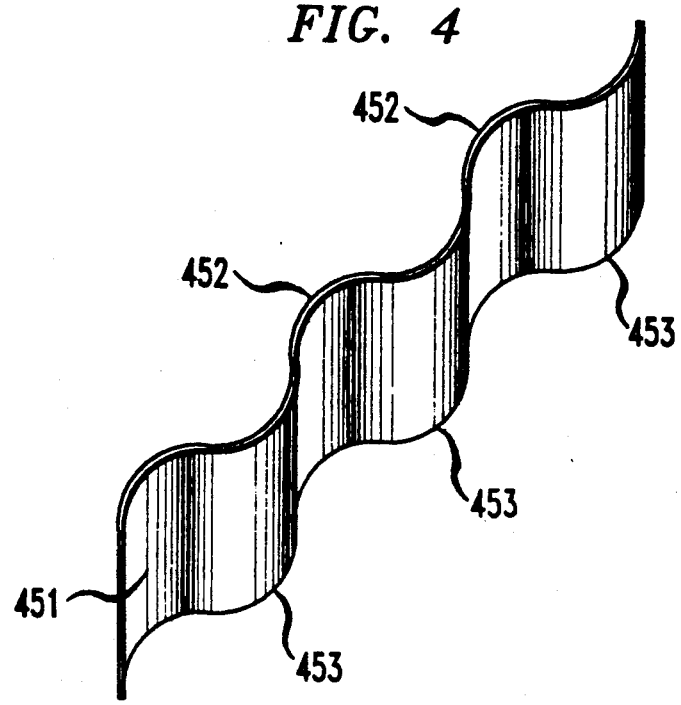
FIG. 4 is a pictorial schematic of a longitudinal spring used in the linear slide disclosed in FIGS. 1 and 2.

The longitudinal spring is shown in pictorial form in FIG. 4. This spring 451 typically has a sinusoidal or undulating shape with alternating peaks 452 and 453 distributed longitudinally along the length of the spring. This spring is constructed of a resilient material with a relatively high modulus of elasticity, such as spring steel. The alternating peaks apply force to the secondary channel base and to the preloading bar as shown in FIGS. 2 and 3 to keep the linear bearing mechanisms in proper adjustment. Longitudinal springs that can be used for this purpose are available commercially from the Smalley Steel Ring Company of Wheeling, Ill.

Figure 5:
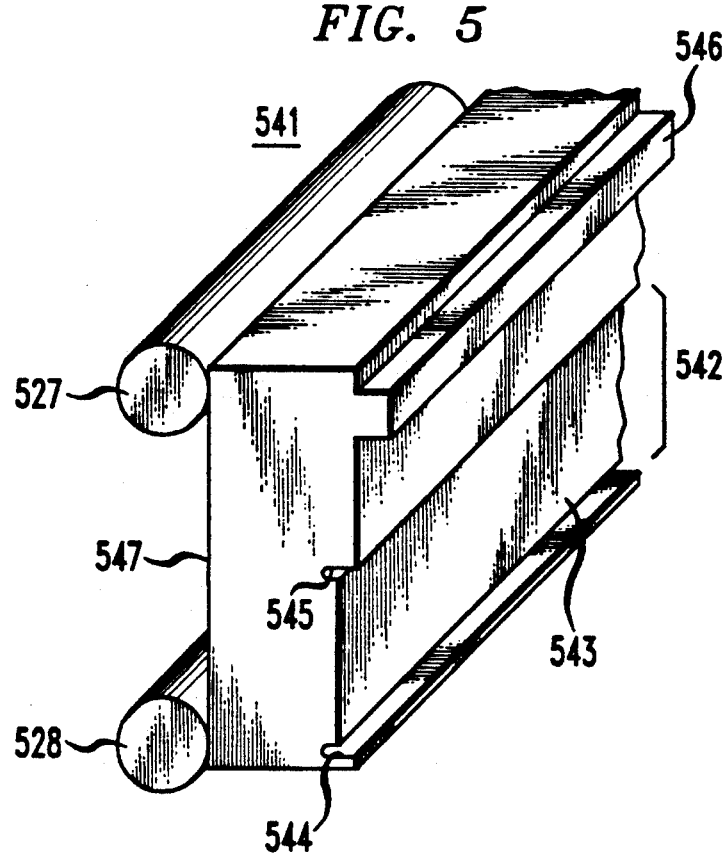
FIG. 5 is a pictorial view of a preloading bar used in the linear slide disclosed in FIGS. 1 and 2.

The preloading bar is shown in pictorial form in FIG. 5. The preloading bar 541 includes a shallow channel 542 with a base surface 543 to accept forces from the peaks of the spring and side walls 544 and 545 to control positioning of the spring. A longitudinal pedestal 546 is included to reduce the rotational compliance of the preloading bar relative to the outer member. The bearing way comprised of rods 527 and 528 is contiguous with the planar surface 547 of the preloading bar. The pedestal 546 is located above the shallow channel 542 engaging the spring and is in direct contact with the base of the shallow channel. It prevents undesirable rotational movement of the preloading bar allowing it to provide continuous dynamic adjustment of the adjacent bearing way.

I claim:

1. A linear slide for a rectilinear motion device; comprising:
an outer member having a primary channel and an inner member located within the primary channel;
first and second linear bearing mechanisms on opposing sidewalls of the primary channel to support and guide the inner member;
a preloading bar contiguous with the second linear bearing mechanism;
a longitudinal spring having a substantially longitudinal sinusoidal contour and being extended longitudinally along the second linear bearing mechanism and located adjacent an inner surface of the outer member and positioned for applying a compressive force against the preloading bar;
the outer member including a secondary longitudinal channel in the wall adjacent to the second linear bearing mechanism into which the preloading bar and the longitudinal spring are inserted with the spring fitted between the base of the longitudinal channel and the preloading bar; and
the preloading bar including a longitudinal groove for accepting and positionally constraining the adjacent spring and a longitudinal pedestal extending along the length of the preloading bar and in contact with a base surface of the secondary longitudinal channel to supply a force operative to reduce rotational compliance of the preloading bar relative to the outer member.

2. Apparatus for providing directed rectilinear motion, comprising:
an outer member with a primary channel opening for accepting an inner member, and two secondary channel openings on opposite walls of the primary channel, for accepting linear bearing mechanisms;
an inner member located in the primary channel opening;
first and second linear bearing mechanisms located in the first and second secondary channels, to support and guide the inner member along the primary channel opening in the outer member;
the first linear bearing mechanism comprising:
an inner bearing way contiguous with the inner member, an outer bearing way contiguous with the outer member, and a plurality of rolling elements between the inner and outer bearing ways;
the second linear bearing mechanism comprising:
an inner bearing way contiguous with the inner member, an outer bearing way, and a plurality of rolling elements between the inner and outer bearing ways;
a preloading bar in the secondary channel and contiguous with the outer bearing way of the second linear bearing mechanism;
a spring having a substantially sinusoidal longitudinal contour being extended longitudinally along the second linear bearing mechanism and mounted between and contiguous with the preloading bar and the base of the second secondary channel, and being compressed to apply a biasing force to the preloading bar and thus to the linear bearing mechanisms; and
the preloading bar including a longitudinal groove for accepting and positionally constraining the adjacent spring and a longitudinal pedestal extending along the length of the preloading bar and in contact with a base surface of the secondary longitudinal channel to supply a force operative to reduce rotational compliance of the preloading bar relative to the outer member.

3. Apparatus for providing directed rectilinear motion, comprising:
an outer member with a primary channel opening for accepting an inner member and secondary channels for accepting linear bearing mechanisms;
an inner member located in the primary channel opening of the outer member;
first and second linear bearing mechanisms located on opposing sides of the inner member to support and guide the inner member within the primary channel of the outer member;
the first linear bearing mechanism comprising:
a first bearing way contiguous with the inner member, a second bearing way contiguous with the outer member, and a plurality of rolling elements between the first and second bearing ways;
the second linear bearing mechanism comprising:
an inner bearing way contiguous with the inner member, an outer bearing way, and a plurality of rolling elements between the inner and outer bearing ways;
a preloading bar contiguous with the outer bearing way of the second linear bearing mechanism;
a longitudinal spring contiguous with the preloading bar and the base of the second secondary channel, to apply compressive force to the preloading bar, this spring having an undulating longitudinal contour with alternate peaks of the undulating contour applying force to the preloading bar and the spring being extended longitudinally along the second linear bearing mechanism; and
the preloading bar including a longitudinal groove for accepting and positionally constraining the adjacent spring and a longitudinal pedestal extending along the length of the preloading bar and in contact with a base surface of the secondary longitudinal channel to supply a force operative to reduce rotational compliance of the preloading bar relative to the outer member.

* * * * *